Feb. 14, 1950  M. L. GREENOUGH  2,497,216
SERVO SYSTEM DERIVATIVE GENERATOR
Filed Sept. 28, 1945  2 Sheets-Sheet 2
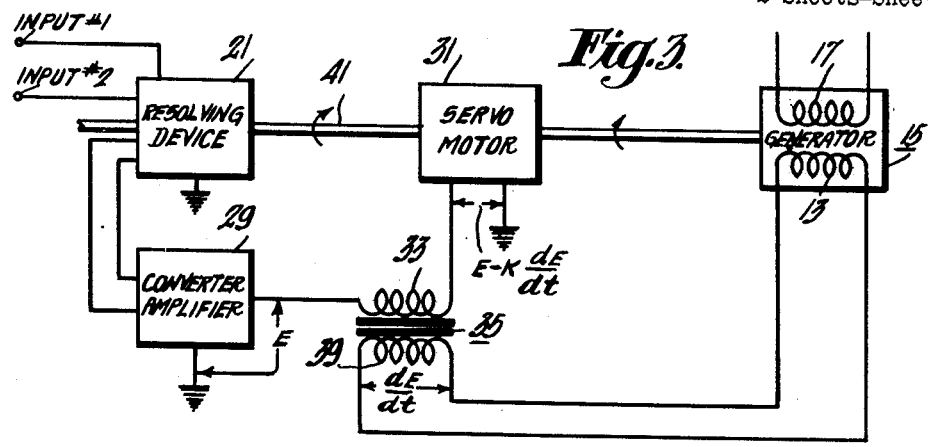
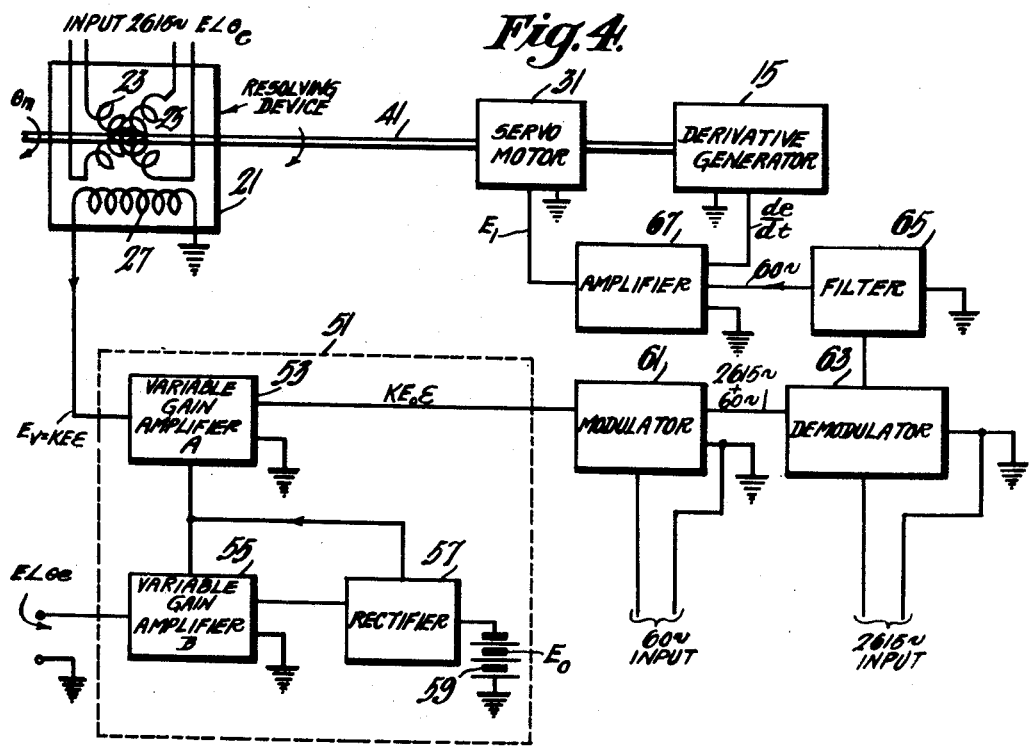
INVENTOR.
Maurice L. Greenough
BY
ATTORNEY Patented Feb. 14, 1950

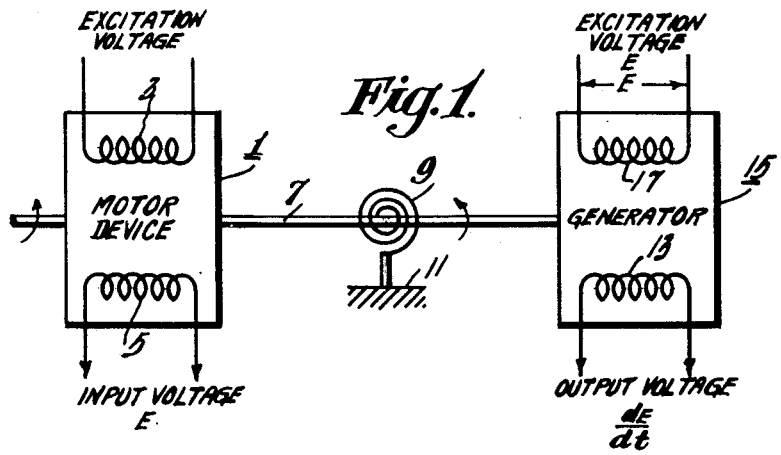
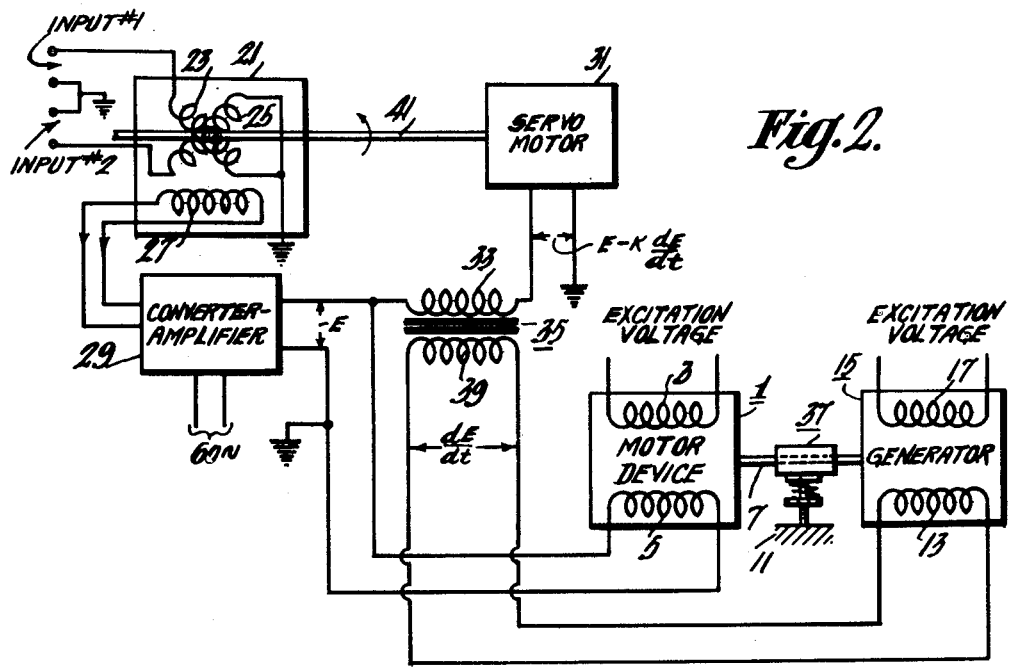

2,497,216

UNITED STATES PATENT OFFICE 2,497,216

SERVO SYSTEM DERIVATIVE GENERATOR

Maurice Leighton Greenough, Groveland, Mass., assignor to Radio Corporation of America, a corporation of Delaware Application September 28, 1945, Serial No. 619,241

5 Claims. (Cl. 318—28)

This invention relates generally to electrical servo systems and more particularly to an improved anti-hunt system for servo mechanisms wherein a voltage proportional to the rate of change of the energizing voltage applied to the servomotor is subtracted from said energizing voltage.

In electronic computing systems for solving ballistic functions in the process of sighting a gun at a remote, fixed or movable target, it is customary to convert the polar coordinates of the present position and course of the target to electrical voltages having magnitudes corresponding to the values of the Cartesian coordinates of the future target position as determined by the target velocity and by the ballistic characteristics of the weapon. The gun azimuth and elevation for deriving the proper trajectory for aiming the weapon at the future target position are converted from Cartesian coordinates in the horizontal and vertical planes to polar coordinates in said planes. The actual gun pointing is accomplished by synchronized motors by servomotor mechanisms which are responsive to voltages corresponding to the angular components of the polar coordinates of the future target position.

For example, the gun azimuth is obtained by impressing upon the perpendicularly-disposed rotor coils of a precision vario-coupler the potentials derived from the electronic computer mechanism representing the future ground plane coordinates. Since the rotor coils are at right angles to each other, the intensity of the field established by them is proportional to the future ground range, and is spatially at an angle to the zero plane of the rotor windings which is equal to the future azimuth angle. The voltage induced in a fixed stator winding of the variocoupler, therefore, is proportional to the horizontal range and to the sine of the angle between the resultant field of the rotor windings and a plant perpendicular to the axis of the fixed stator winding.

The servomotor and the variocoupler rotor are mounted upon, or geared to, a common rotatable shaft. The output voltage derived from the variocoupler stator winding is applied to a converter-amplifier circuit which drives the servomotor in a direction which tends to reduce the stator voltage of the variocoupler to a zero value. In other words, the variocoupler rotor is rotated by the servomotor until the resultant field of the rotor windings is perpendicular to the axis of the stator winding whereby the shaft is rotated through an angle equal to the azimuth angle. Correction voltages for windage and drift may be added in series with the output voltage of the stator winding, whereby such corrections may be effectively added to the normal azimuth angle. The resolving variocoupler and servomotor are coupled to synchronous motor units for coarse control of the gun pointing. Finer control of the gun pointing is obtained by other synchronous motors differentially connected to the coarse motor control and having a relatively high ratio of angular displacement to that of the variocoupler shaft.

The converter-amplifier circuit interposed between the resolving variocoupler stator winding and the servomotor comprises a circuit which is responsive to the relatively high computer frequency (for example, 2615 cycles) and to the power line frequency (60 cycles) for deriving a signal of the power line frequency which varies in amplitude substantially only as a function of the unbalance of the rotor and stator of the variocoupler. The converter-amplifier circuit includes an automatic volume-control network for stabilizing the loop gain of the circuit in order that the servomotor energizing currents may be substantially independent of variations in the amplitude of the variocoupler rotor currents.

In order to minimize hunting and overshooting by the servomotor, apparatus is provided for generating a correction current which is proportional to the rate of change of the servomotor energizing current. The correction current is effectively subtracted from the normal servomotor energizing current. This feature provides maximum starting and stopping torque while preventing abnormally high motor acceleration during the remainder of the time during which the servomotor is rotated.

The instant invention comprises a novel rotary differentiating voltage generator the rotor of which may be separately driven by the servomotor energizing current or which may be connected directly to, or geared to, the servomotor shaft. The field of the generator is excited by currents of the same frequency as that of the servomotor energizing current. The differentiating current generator may comprise any well known type of rotary apparatus such as a two-phase motor, wherein the output voltage is directly proportional to the rate of change of the generator shaft angular velocity. The novel differentiating current generator is superior to other types of reactive or passive networks in that the derivative signals generated thereby may be of relatively higher power or voltage. The servomotor may be a conventional shaded-pole reversible motor or any other of the types employed in conventional servo systems.

Among the objects of the invention are to provide an improved method of and means for operating servomotor systems. Another object is to provide an improved servomotor system including an anti-hunt network. A further object is to provide an improved servo system having an anti-hunt circuit comprising a differentiating voltage network responsive to the servomotor energizing potential for generating a correction voltage proportional to the rate of change of the energizing voltage, wherein the correction voltage is subtracted from the servomotor energizing voltage. An additional object is to provide an improved servomotor energizing and correction voltage network including a resolving variocoupler for converting the Cartesian coordinates of a position to voltages representing the angular component of the polar coordinates of said position, means for generating a correction voltage proportional to the first derivative of said output voltage, and means for subtracting the correction voltage from the output voltage for providing a driving voltage for said servo mechanism. Another object is to provide an improved differentiating voltage generator comprising a rotary electric machine having a field winding excited by the voltage to be differentiated and having an armature winding providing a voltage having a magnitude proportional to the rate of change of angular velocity of the armature.

The invention will be described in greater detail by reference to the accompanying drawings of which Figure 1 is a schematic circuit diagram of a preferred embodiment of a differentiating voltage generator; Figures 2 and 3 are partially blocked, schematic diagrams illustrative of the application of said differentiating voltage generator to a servo motor driving network; and Figure 4 is a schematic circuit diagram of a converter-amplifier circuit forming a component of said servomotor driving networks. Similar reference characters are applied to similar elements throughout the drawings.

Referring to Figure 1 of the drawings, a rotary motor device 1, such as, for example, a shaded-pole servomotor, includes a field winding 3 and an armature winding 5. The field winding may be excited by means of 60 cycle alternating currents and the armature winding may be excited by means of the servomotor control voltage or by any other voltage which it is desired to differentiate. The motor shaft 7 is restrained by means of a spiral spring 9 which is anchored to a rigid support 11. The motor shaft drives the armature winding 13 of a derivative voltage generator 15 which includes a field winding 17 which is excited by the voltage E to be differentiated.

The derivative generator 15 may be any type of rotary apparatus such as a two-phase motor or other device which generates a voltage proportional to the angular velocity of the motor shaft. Therefore the output voltage derived from the armature winding 13 will be the first derivative $dE/dt$ of the excitation voltage E and will be directly proportional to the angular velocity of the motor shaft 7 which drives the armature winding.

Application of the input voltage E to the armature winding 5 of the motor device 1 provides a change in torque in the motor shaft 7, rotating the motor shaft to an angular position wherein the motor torque equals the torque of the spiral spring 9. This rotation is transmitted to the generator armature winding 13 which induces a voltage in said generator armature winding for the duration of the rotary motion of the motor shaft 7.

The device is especially applicable to motor drive devices of the servo type wherein the driving rotor is rotated through only a fraction of a revolution. However if continuous derivative voltages are desired from continuously rotated motor driven sources, a brake may be substituted for the spiral spring 9, as illustrated hereinafter in the circuit of Figure 2. However a brake does not give the same derivative output as does a spring. The derivative output of the generator when a spring-type brake is used, so long as the angular deviation of the shaft is equal to the applied torque, which is in turn proportional to the excitation voltage applied to the motor, will be a true derivative, $dE/dt$, as is readily verified. The output voltage is a somewhat different derivative of the excitation voltage E when a different type brake is used.

If there is substantially no time lag between the input voltage and the resultant rotation of the motor device, a true derivative of the input voltage would be derived from the generator armature winding 13. In practice, the time lag involved has been found to be negligible when the derivative voltage $dE/dt$ is employed for stabilizing the input voltage to a servomotor, as described heretofore. It should be understood that, if desired, either or both of the motor and generator devices may employ either alternating or direct current field excitation.

Figure 2 illustrates a servomotor control system which includes the derivative generator system of the circuit of Figure 1. A resolving device 21 such as, for example, a precision variocoupler having a fixed stator winding 27 and rotatable mutually perpendicular rotor windings 23 and 25 excited by current proportional in magnitude to the values of the Cartesian coordinates of a variable quantity or position. The resultant field of the normally disposed rotor windings 23 and 25 induces a voltage in the stator winding 27 which is proportional in magnitude to the amplitudes of the input voltages to the rotor windings 23 and 25 and to the sine of the angular displacement of the resultant field of the rotor windings 23 and 25 with respect to a plane perpendicular to the axis of the stator winding 27.

The stator voltage is applied to a converter-amplifier circuit 29 which is responsive to the relatively high frequency (2615 cycle) currents derived from the resolving device and to power line frequency (60 cycle) currents for actuating the servomotor. The converter-amplifier 29 will be described in detail hereinafter by reference to the circuit of Figure 4. A signal of the power line frequency having voltage E is derived from the converter-amplifier circuit 29. This signal varies in amplitude substantially only as a function of the unbalance of the variocoupler rotor which provides (2615 cycle) currents from the stator winding 27 of the resolving device 21. The converter-amplifier circuit includes an automatic-volume-control network for stabilizing the loop gain of the circuit in order that the servomotor energizing currents may be substantially independent of variations in the amplitude of the (2615 cycle) variocoupler rotor input currents. The output currents derived from the converter-amplifier 29 are applied to a servomotor 31 through the series-connected secondary winding 33 of a transformer 35.

The output voltage E of the converter-amplifier 29 also is applied to the armature winding 5 of the motor device 1 of a differentiating generator of the type described heretofore by reference to the circuit of Figure 1. The motor shaft 7 of the differentiating voltage generator is coupled to a restraining spring 9 of the type shown in Figure 1 or to an adjustable brake device 37. The shaft 7 drives the armature winding 13 of the derivative generator element 15 to generate a derivative voltage $dE/dt$. The derivative voltage is applied to the primary winding 39 of the transformer 35 in a manner whereby the derivative voltage $$\frac{KdE}{dt}$$

is subtracted from the voltage derived from the converter amplifier 29, and is applied to energize the servomotor 31. The servomotor 31, differentiating voltage generator motor 1 and derivative generator 15 may be excited by 60 cycle currents or currents of any other frequency from a source not shown.

The servomotor shaft 41 rotates the perpendicularly-disposed rotor windings 23 and 25 of the resolving device until the resulting field of the rotor windings is perpendicular to the axis of the stator winding 27 of the resolving device. Thus the servomotor is rotated through an angle corresponding to the unbalance angle of the resultant rotor field with respect to the stator axis. The derivative voltage $dE/dt$ which is subtracted from the output voltage E derived from the converter output circuit 29 tends to stabilize the operation of the servomotor 31 in response to signals applied thereto by providing maximum starting and stopping torque while preventing abnormally high motor acceleration during the remainder of the time which the servomotor is rotated, thus effectively preventing overshooting or hunting of the servomotor.

The embodiment of the invention shown in Figure 3 is identical in all respects to that of the circuit of Figure 2 with the exception that the derivative generator 15 is driven directly by the servomotor and the restraining spring or braking devices have been deleted from the system. In both of the systems of Figures 2 and 3, the servomotor may comprise a conventional shaded-pole induction motor the angular rotation of which is responsive to the amplitude of the currents applied thereto.

Referring to Figure 4, a servomotor control and stabilizing network includes a variocoupler type resolving device, a converter-amplifier for controlling the servo energizing currents as a function of the unbalance of the variocoupler, a servomotor, and a derivative generator for stabilizing the operation of the servomotor. The servomotor converter-amplifier control circuit is disclosed and claimed in applicant's copending application Serial No. 619,398, filed September 29, 1945, and assigned to the same assignee as the instant application.

The variocoupler 21 is of the precision type including the fixed stator winding 27 and the pair of perpendicularly disposed rotatable rotor windings 23 and 25. The rotor shaft 41 of the variocoupler 21 is coupled to the armature of the servomotor 31 and to the armature of the derivative voltage generator 15. Input signals to the servo system applied to the rotor windings 23 and 25 correspond to the values of the Cartesian coordinates of a position to which the servo system is to be adjusted. The input voltages have a magnitude E at an electrical phase angle $\theta_e$.

It is desirable that the system shall have an operating characteristic which is substantially independent of the magnitude E of the input voltages, since it is essential that the servomotor torque be proportional only to the angular deviation of the variocoupler rotor from balance. Therefore, a converter-amplifier system is provided for deriving energizing currents for the servomotor which are a function only of the angular deviation of the variocoupler rotor from balance.

For this purpose an inverse-gain-control amplifier 51 is provided for deriving output signals having a magnitude substantially proportional only to the angular deviation from balance of the variocoupler windings. The inverse-gain-control amplifier includes a first variable-gain amplifier 53 which is connected to the variocoupler stator winding 27 and is responsive to the stator voltage $E_v = KE_\epsilon$ where $\epsilon$ is the angular deviation from balance of the variocoupler rotor. A second variable-gain amplifier 55 is responsive to the rotor input voltage E at a phase angle $\theta_e$. The output of the second variable-gain amplifier 55 is connected to a rectifier 57 having a fixed bias $E_0$ derived, for example, from a battery 59. Signals derived from the rectifier 57 are proportional in magnitude to the difference of the output voltages of the second variable-gain amplifier 55 and the reference potential $E_0$. The difference voltage thus obtained is applied to both variable gain amplifiers 53 and 55 to control the gain thereof. The gain of both amplifiers is the same for all bias voltage values. Since the input to the second variable gain amplifier 55 is the voltage vector E being resolved, the gain of the first variable-gain amplifier will be inversely proportional to the rotor input voltage E. Therefore the output voltage $E_s$ derived from the first variable-gain amplifier 53 will be equal to $KE_0\epsilon$, where $\epsilon$ is the angular deviation from balance of the variocoupler rotor.

Since K and $E_0$ both are constants, the output voltage from the first variable-gain amplifier is dependent only upon the angular deviation from balance of the variocoupler rotor. The output voltage $E_s$ has a frequency of 2615 cycles which corresponds to the input frequency to the variocoupler rotor windings.

The output signal $E_s$ from the first variable-gain amplifier 53 is applied to a modulator circuit 61 which also is responsive to signals having a frequency of 60 cycles for driving the servomotor. Signals having both 2615 cycle and 60 cycle components derived from the modulator 61 are applied to a demodulator 63 which also has applied thereto other input signals of the 2615 cycle frequency. The output of the demodulator 63 is applied to a low-pass filter 65 which rejects the higher frequency signal components and passes the 60 cycle signals. The 60 cycle signals derived from the filter 65 are amplified by a power amplifier 67 and applied to the armature winding of the servomotor 31 to rotate the servomotor and the rotor windings 23 and 25 of the variocoupler 21 in a direction to balance the variocoupler. Such balance obtains when the resultant field of the rotor windings 23 and 25 is perpendicular to the axis of the stator winding 27 of the variocoupler. The derivative generator 15 coupled to the servomotor 31 is of the type described and claimed in applicant's copending application Serial No. 619,240, filed September 28, 1945. The derivative voltage $$\frac{dE}{dt}$$

is proportional in magnitude to the rate of change of angular velocity of the variocoupler shaft 41, and is applied in phase opposition to the 60 cycle input voltages applied to the amplifier 67 for stabilizing the operation of the servomotor and for minimizing overshooting and hunting thereof.

Considering the operation of the inverse-gain-control amplifier from a somewhat different standpoint, it is seen that $$E \times (\text{gain of amplifier B}) = E_0 \quad (1)$$

Since the gain of amplifier B equals the gain of amplifier A, the gain of amplifier A equals $$\frac{E_0}{E}$$

The stator voltage $E_v$ derived from the variocoupler is proportional to the rotor input voltage E and to the angular deviation from balance. Thus $E_v = KE\epsilon$. (2)

Therefore, the output voltages $E_s$ derived from amplifier A are $$E_s = E_v \, (\text{gain of } A) = KE\epsilon \times \frac{E_0}{E} = KE_0 \times \epsilon \quad (3)$$

Since K and $E_0$ are fixed, it follows that the output voltage $E_s$ derived from the first variable gain amplifier 53 is dependent only upon the angular deviation from balance $\epsilon$ of the variocoupler. The component circuits of the remainder of the control system are linear, so that the system loop gain is a constant value determined only by circuit components.

Thus the invention comprises an improved anti-hunt system for servo mechanisms comprising a rotary generator mechanically coupled to the servomotor, the generator armature providing an output voltage proportional in magnitude to the rate of change of angular velocity of the servomotor shaft. The output voltage, therefore, is proportional to the first derivative of the servomotor driving voltage and is effectively subtracted from said driving voltage to minimize hunting and overshooting by the servomotor. The derivative generator is excited by currents of the power line frequency driving the servomotor. The device is described in combination with a constant loop-gain servo energizing circuit.

I claim as my invention:

1. An electro-mechanical device for generating a voltage to be applied to a servo-control system having a work load and which voltage is proportional in magnitude to the first derivative of an input voltage comprising an electric motor and a generator each having fixed and rotor windings, said rotor windings being coupled to a common shaft, a torque brake distinct from said servo-control system work load and comprising a helical spring anchored to said shaft, means for exciting one of said windings of both said motor and said generator, means for applying said input voltage to the remaining winding of said motor to provide rotation of said shaft against the retarding torque of said brake as a function of the magnitude of said input voltage, and means for deriving an output voltage proportional in magnitude to the angular velocity of said shaft from the remaining winding of said generator.

2. An electro-mechanical device for generating a voltage to be applied to a servo-control system having a work load and which voltage is proportional in magnitude to the first derivative of an input voltage comprising an electric motor and a generator each having fixed and rotor windings, said rotor windings being coupled to a common shaft, a brake distinct from said servo-control system work load and coupled to said shaft, means for exciting one of said windings of both said motor and said generator, means for applying said input voltage to the remaining winding of said motor to provide rotational torque of said shaft against the retarding torque of said brake as a function of the magnitude of said input voltage, and means for deriving an output voltage proportional in magnitude to the angular velocity of said shaft from the remaining winding of said generator.

3. An electro-mechanical device for generating a voltage to be applied to a servo-control system having a work load and which voltage is proportional in magnitude to the first derivative of an input voltage comprising an electric motor and a generator each having fixed and rotor windings, said rotor windings being coupled to a common shaft, a brake distinct from said servo-control system work load and coupled to said shaft, alternating current means for exciting one of said windings of both said motor and said generator, means for applying said input voltage to the remaining winding of said motor to provide rotation of said shaft against the retarding torque of said brake as a function of the magnitude of said input voltage, and means for deriving an output voltage proportional in magnitude to the angular velocity of said shaft from the remaining winding of said generator.

4. Apparatus for stabilizing a servomotor control system including a servomotor, a circuit for energizing said servomotor in response to input signals, and a motor stabilizing system comprising an electro-mechanical device for generating a voltage which is proportional in magnitude to the first derivative of said motor energizing voltage derived from said circuit, said device comprising an electric control motor and a generator each having fixed and rotor windings, said rotor windings being coupled to a common shaft, a brake coupled to said shaft, means for exciting one of said windings of both said control motor and said generator, means for applying said motor energizing voltage to the remaining winding of said control motor to provide rotation of said shaft against the retarding torque of said brake as a function of the magnitude of said motor energizing voltage, means for deriving an output voltage proportional in magnitude to the angular velocity of said shaft from the remaining winding of said generator, and means for applying said output voltage to said servomotor energizing circuit to stabilize the operation of said servomotor.

5. Apparatus for stabilizing a servomotor control system having a work load including a servomotor, a circuit for energizing said servomotor in response to input signals, and a motor stabilizing system comprising an electro-mechanical device for generating a voltage which is proportional in magnitude to the first derivative of an input voltage comprising a generator having fixed and rotor windings, said rotor windings being coupled to the shaft of said servomotor, a brake distinct from said work load coupled to said shaft, means for exciting one of said windings of said generator, means for applying said input signals to said motor to provide rotation of said shaft against the retarding torque of said brake as a function of the magnitude of said input signals, means for deriving an output voltage proportional in magnitude to the angular velocity of said shaft from the remaining winding of said generator, and means for applying said output voltage to said servomotor.

MAURICE LEIGHTON GREENOUGH.

REFERENCES CITED

The following references are of record in the file of this patent:

UNITED STATES PATENTS

| Number | Name | Date |
|---|---|---|
| 2,113,436 | Williams | Apr. 5, 1938 |
| 2,115,086 | Riggs | Apr. 26, 1938 |
| 2,151,718 | Riggs | Mar. 28, 1939 |
| 2,176,102 | Riggs | Oct. 17, 1939 |
| 2,280,019 | Alexandersson et al. | Apr. 14, 1942 |